(12) United States Patent
Duan et al.

(10) Patent No.: US 10,577,983 B2
(45) Date of Patent: Mar. 3, 2020

(54) POWER GENERATION SYSTEM AND METHOD

(71) Applicant: NANYANG TECHNOLOGICAL UNIVERSITY, Singapore (SG)

(72) Inventors: Fei Duan, Singapore (SG); Swapnil Dubey, Singapore (SG); Fook Hoong Choo, Singapore (SG); Lu Qiu, Singapore (SG); Kai Wang, Singapore (SG)

(73) Assignee: Nanyang Technological University, Singapore (SG)

( * ) Notice: Subject to any disclaimer, the term of this patent is extended or adjusted under 35 U.S.C. 154(b) by 37 days.

(21) Appl. No.: 15/759,826

(22) PCT Filed: Sep. 15, 2016

(86) PCT No.: PCT/SG2016/050446
§ 371 (c)(1),
(2) Date: Mar. 13, 2018

(87) PCT Pub. No.: WO2017/048192
PCT Pub. Date: Mar. 23, 2017

(65) Prior Publication Data
US 2018/0266279 A1   Sep. 20, 2018

(30) Foreign Application Priority Data

Sep. 15, 2015  (SG) .......................... 10201507652V

(51) Int. Cl.
*F01K 23/10*   (2006.01)
*F02G 1/055*   (2006.01)
(Continued)

(52) U.S. Cl.
CPC ............ *F01K 23/10* (2013.01); *F01K 23/067* (2013.01); *F02C 3/22* (2013.01); *F02C 6/18* (2013.01);
(Continued)

(58) Field of Classification Search
CPC .... F02G 1/055; F02C 3/22; F02C 6/18; F17C 7/04; F01K 23/10
(Continued)

(56) References Cited

U.S. PATENT DOCUMENTS 3,937,017 A * 2/1976 Beschorner ............. F02G 1/043
60/516
4,462,212 A * 7/1984 Knoos ................... F02G 1/0445
60/526
(Continued)

FOREIGN PATENT DOCUMENTS

JP   2006200431 A      8/2006
JP   2008175151 A  *   7/2008 ............. F02G 1/055
(Continued)

OTHER PUBLICATIONS

JP-2008175151-A English Translation (Year: 2008).*
(Continued)

*Primary Examiner* — Mark A Laurenzi
*Assistant Examiner* — Shafiq Mian

(57) ABSTRACT

A power generation system comprising: a liquefied natural gas (LNG) regasification unit configured to perform a regasification process to regasify LNG supplied from an LNG source to produce natural gas, the regasification process
(Continued)

producing cold energy; a gas turbine configured to combust the natural gas to output power, the combusting producing an exhaust gas; a thermal storage unit configured to store heat obtained from the exhaust gas; and a Stirling engine configured to output power, the Stirling engine having a hot end heated by the heat stored in the thermal storage unit and a cold end cooled by the cold energy from the regasification process.

9 Claims, 1 Drawing Sheet

(51) Int. Cl.
    *F02C 6/18*     (2006.01)
    *F02C 3/22*     (2006.01)
    *F01K 23/06*     (2006.01)
    *F17C 7/04*     (2006.01)
    *F28D 20/02*     (2006.01)

(52) U.S. Cl.
    CPC ............... *F02G 1/055* (2013.01); *F17C 7/04* (2013.01); *F02G 2254/15* (2013.01); *F02G 2256/50* (2013.01); *F17C 2221/033* (2013.01); *F17C 2270/0581* (2013.01); *F28D 20/02* (2013.01); *Y02E 20/14* (2013.01); *Y02E 20/18* (2013.01); *Y02E 20/363* (2013.01)

(58) Field of Classification Search
    USPC .................................................. 60/525–527
    See application file for complete search history.

(56) References Cited

U.S. PATENT DOCUMENTS

| | | | | |
|---|---|---|---|---|
| 5,127,369 | A * | 7/1992 | Goldshtik | ............... F01B 21/00 123/19 |
| 6,715,313 | B1 * | 4/2004 | Takafu | ....................... F02G 1/00 60/517 |
| 7,694,514 | B2 * | 4/2010 | Smith | ........................ F25B 9/00 60/517 |
| 2010/0212656 | A1 * | 8/2010 | Qiu | ............................ F03G 6/06 126/618 |
| 2013/0081390 | A1 * | 4/2013 | Takahashi | ............... F02G 1/055 60/531 |
| 2013/0091839 | A1 * | 4/2013 | Takahashi | ............... F02G 1/055 60/517 |

FOREIGN PATENT DOCUMENTS

| | | | | |
|---|---|---|---|---|
| JP | 2008175151 A | | 7/2008 | |
| JP | 2014207719 A | * | 10/2014 | ............. F02G 1/055 |
| RU | 2166705 C1 | | 5/2001 | |
| WO | 2017048192 A1 | | 3/2017 | |

OTHER PUBLICATIONS

JP 2014207719 A English Translation (Year: 2014).*
Foreign Communication From a Related Coutnerpart Application, International Search Report and Written Opinion dated Feb. 11, 2016, International Application No. PCT/SG2016/050446 filed on Sep. 15, 2016.

* cited by examiner

POWER GENERATION SYSTEM AND METHOD

CROSS-REFERENCE TO RELATED APPLICATIONS

The present application is a filing under 35 U.S.C. 371 as the National Stage of International Application No. PCT/SG2016/050446, filed Sep. 15, 2016, entitled "POWER GENERATION SYSTEM AND METHOD," which claims priority to Singapore Application No. SG 10201507652V filed with the Intellectual Property Office of Singapore on Sep. 15, 2015, both of which are incorporated herein by reference in their entirety for all purposes.

FIELD

This invention relates to a power generation system and method, and in particular to a power generation system and method fueled by liquefied natural gas.

BACKGROUND

Compared with traditional long-carbon-chain fossil fuels, natural gas has high reserves, a higher energy density, and does not contain sulphur. Natural gas fuel can produce remarkably lower emissions. It produces the lowest level of $CO_2$ in all hydrocarbon fuels. Compared to traditional fossil fuels, natural gas reduces benzene emissions by 97%, $NO_x$ emissions by 80%, carbon monoxide (CO) emissions by 76%, and $CO_2$ emissions by 22%. The use of nature gas does not produce lead, sulphur emissions, or particulate matters. When natural gas is cooled to a temperature of approximately −162° C. at atmospheric pressure, it condenses into liquefied natural gas (LNG). Since the density of LNG is 460 kg/m$^3$, the volume of LNG takes up approximately 1/600 that of natural gas. LNG is an odourless, colourless, non-corrosive, and non-toxic liquid. The unit volume reduction dramatically eases its transport. The liquefaction process of natural gas removes $O_2$, $CO_2$, $SO_x$, and water vapor. In addition, the lower fuel cost per unit mass of LNG becomes less in comparison with the traditional fossil fuels; LNG, mainly made up of paraffinic compounds, results in the combustion efficiency higher than that of traditional fossil fuels. Therefore, LNG is a promising fuel in the market of power generation.

Although LNG is convenient to transport and store with a specific volume compared with the gas phase, it is necessary to regasify LNG before combustion can take place in a gas turbine for stationary power generation. A large amount of cold energy can be produced during the regasification process while exhaust gas from combustion of regasified LNG in the gas turbine contains abundant low-temperature thermal energy.

Various LNG regasification systems have been disclosed, as well as systems to generate energy or power using the cold energy produced during LNG regasification. However, efficiency in regasification and power generation is still not optimized in any of the known systems, and can be further improved.

SUMMARY

The present application discloses a power generation system fuelled by LNG to recover exhaust thermal energy and cold energy from LNG regasification simultaneously with one single Stirling engine.

The power generation system uses LNG (or any liquid combustible gas) for gas turbine power generation after regasification of LNG, and applies cold energy from the LNG regasification and hot energy of exhaust gas from the gas turbine to drive a Stirling engine. A thermal storage system based on phase change materials (PCMs) is used to store the exhaust heat, stabilize the temperature of the exhaust gas and supply heat to a hot end of the Stirling engine.

The advantage of this is that a higher thermal efficiency is anticipated due to the large temperature differences between the hot end and cold end. The system provides a high efficient, highly integrated, and stable combined power generation system from LNG by comprehensive utilization of energies stored in LNG, including chemical energy, cold energy, and exhaust heat after combustion.

According to a first aspect, there is provided a power generation system comprising: a liquefied natural gas (LNG) regasification unit configured to perform a regasification process to regasify LNG supplied from an LNG source to produce natural gas, the regasification process producing cold energy; a gas turbine configured to combust the natural gas to output power, the combusting producing an exhaust gas; a thermal storage unit configured to store heat obtained from the exhaust gas; and a Stirling engine configured to output power, the Stirling engine having a hot end heated by the heat stored in the thermal storage unit and a cold end cooled by the cold energy from the regasification process.

The thermal storage unit may comprise at least one phase change material.

The thermal storage unit may be embedded with the hot end of the Stirling engine.

A heat exchanger of the regasification unit may be embedded with the cold end of the Stirling engine.

According to a second aspect, there is provided a method of power generation, the method comprising the steps of:
(a) regasifiying LNG in a regasification process to produce natural gas, the regasification process producing cold energy;
(b) combusting the natural gas in a gas turbine to output power, the combusting producing an exhaust gas;
(c) storing heat obtained from the exhaust gas in a thermal storage unit; and
(d) heating a hot end of a Stirling engine with the heat stored in the thermal storage unit and cooling a cold end of the Stirling engine with cold energy from the regasification process to output power with the Stirling engine.

Storing the heat may comprise storing the heat in at least one phase change material in the thermal storage unit.

The method may further comprise directly spraying the cold end of the Stirling engine with LNG.

BRIEF DESCRIPTION OF FIGURES

In order that the invention may be fully understood and readily put into practical effect there shall now be described by way of non-limitative example only exemplary embodiments of the present invention, the description being with reference to the accompanying illustrative drawings.

DETAILED DESCRIPTION

Figure 1:
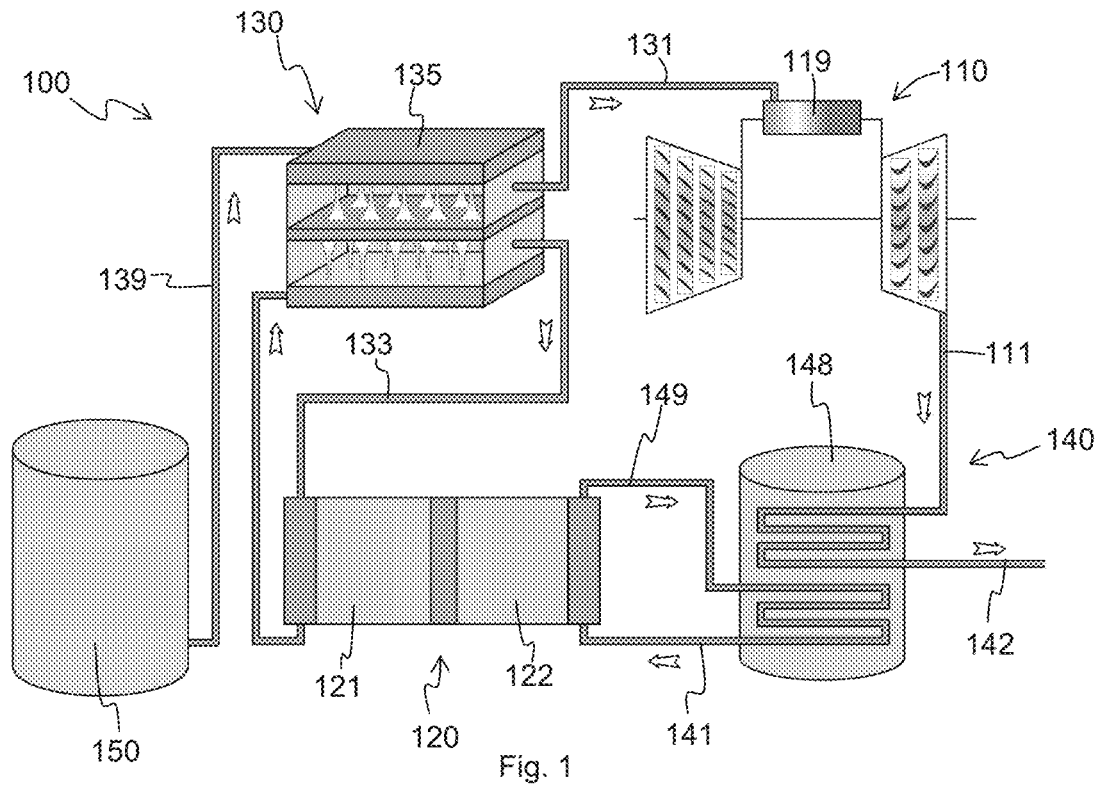
FIG. 1 is a schematic illustration of a power generation system.

Exemplary embodiments of the power generation system 100 will be described below with reference to FIGS. 1 and 2. The same reference numerals are used throughout the figures to denote the same or similar parts among the various embodiments.

The power generation system 100 is a liquid natural gas (LNG) fuel based co-generation system 100 which comprises two engines: gas turbine engine 110 and a Stirling engine 120. In one embodiment, the gas turbine may be a 30 kW turbine while the Stirling engine 120 may be a 3 kW engine. However, the outputs of the gas turbine and the Stirling engine could be up to 100 MW and 10 MW after scaling up.

The Stirling engine 120 utilizes a known Stirling cycle for outputting mechanical work as a net conversion of heat energy from cyclic compression and expansion of a fixed mass of gas under different temperatures. The Stirling engine 120 has a cold end 121 and a hot end 122, between which the fixed mass of gas in the Stirling engine is allowed to move. At the hot end 122, the gas expands because its temperature rises due to external heat applied to the hot end 122. Expansion of the gas does work which is the output of the Stirling engine. This work is typically in the form of movement of an output piston that is moved by the gas expanding against it. Momentum obtained from the output is harnessed to compress the expanded gas. Compression of the gas increases its temperature, so cold energy is externally applied to the cold end 121 to remove heat generated by the compression. The compressed gas is once again expanded by heating at the hot end 122 to repeat the work cycle.

The gas turbine 110 consumes natural gas 131 as the fuel which is regasified from LNG 139 in a LNG regasification unit 130, and discharges high temperature exhaust gas 111. The LNG regasification unit 130 may be a double impingement unit, and is supplied with LNG 139 from an LNG storage tank 150. The power generation system 100 also includes a thermal storage system 140 on the basis of PCMs. The Stirling engine 120 is used to recover cold energy 132 from the LNG regasification process 130 and the heat energy in the exhaust gas 111 from the gas turbine 110, simultaneously. The cold energy 132 is applied to the cold end 121 of the Stirling engine 120 to remove heat generated by compression of the gas in the Stirling engine 120, while the heat energy in the exhaust gas 111 is applied to the hot end 122 of the Stirling engine to heat and thereby expand the gas in the Stirling engine 120.

Figure 2:
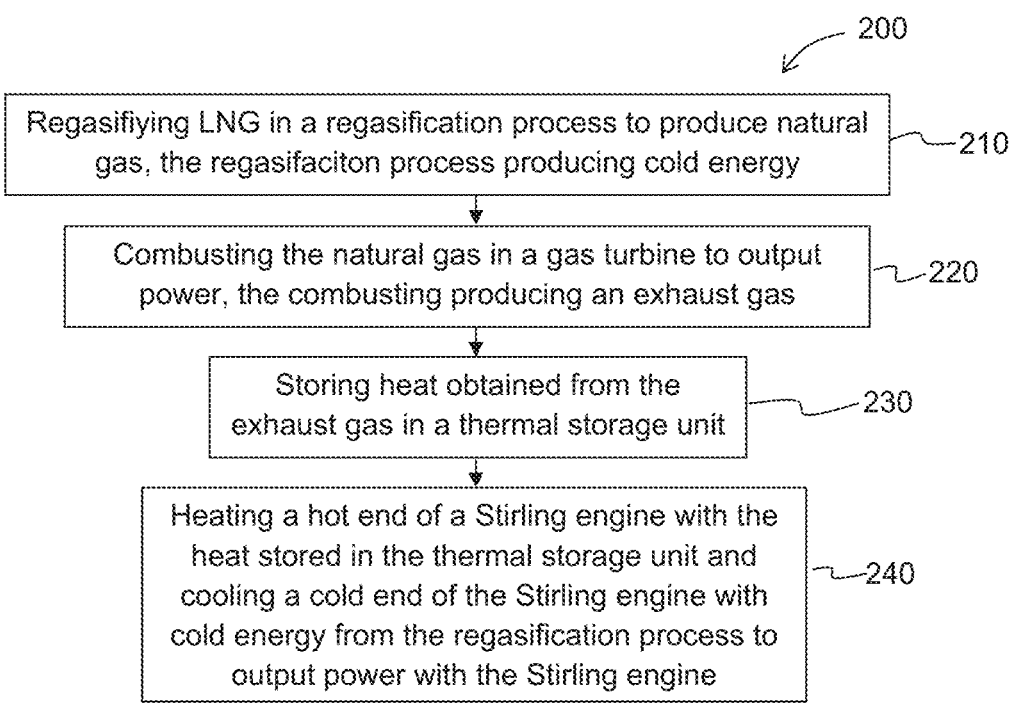
FIG. 2 is a flow chart of a method of power generation.

A schematic illustration of the power generation system 100 is shown in FIG. 1. The first power generation subsystem 110 is the gas turbine 110. Natural gas 131, which is regasified from LNG 139 in the LNG regasification unit 130, is pumped into a combustor 119 of the gas turbine 110. The natural gas 131 may have a temperature of about 20° C., or room temperature. Heat energy of hot exhaust gas 111 from the gas turbine 110 is stored in a PCM thermal storage tank 148 of the thermal storage system 140 into which the hot exhaust gas 111 is passed. The hot exhaust gas 111 may have a temperature of about 285-650° C., while the PCM thermal storage tank 148 may have a temperature of about 220-600° C., depending on the temperature of hot exhaust gas 111. Exhaust gas that leaves the PCM thermal storage tank 148 as emission 142 may have a temperature of about 200° C.

The second power generator 120 is the Stirling engine 120 which operates between its high temperature or hot end ($T_H$) 122 and its cold end ($T_C$) 121. The hot end 122 is heated by a thermal fluid loop 141 of the thermal storage system 140 with heat from the PCM tank 148, and may have a temperature of about 200-580° C. The cold end 121 is cooled by cold energy from a thermal fluid loop 133 of the LNG regasification unit 130, and may have a temperature of about −100° C.

Boiling temperature (at 1 atm) of LNG is −162° C., which significantly decreases the cold end 121 temperature of the Stirling engine 120, and increases its energy efficiency. In the power generation system 100, regasification of LNG 139 in the LNG regasification unit 130 heats the LNG 139 to produce natural gas 131 for the gas turbine 110 and also cools the cold end 121 of the Stirling engine 120. Thermal energy from the hot exhaust gas 111 of the gas turbine 110 is stored in the thermal storage unit 140 and applied to maintain the hot end 122 of the Stirling cycle 120. Aside from the Stirling engine 120, the LNG regasification unit 130 and the thermal storage unit 140 are thus two core components in the system 100.

The LNG regasification unit 130 comprises a heat exchanger 135 in which the LNG 139 absorbs heat energy and converts into gas phase 131 on one side of the heat exchanger 135. On the other side of the heat exchanger 135, the heat is taken away and the object is cooled down to a very low temperature.

In one embodiment of a compact design of the system 100, the heat exchanger 135 may be embedded in the Stirling engine 120, i.e. embedded with the cold end 121 of the Stirling engine 120, so that the heat transfer is conducted directly between the LNG 139 undergoing regasification in the regasification unit 130 and the Stirling engine 120.

In order to enhance heat transfer rate as well as the LNG phase change rate, LNG 139 from the LNG storage tank 150 may also simultaneously be sprayed (or otherwise impinged) onto the cold end 121 of the Stirling engine 120.

To enable the Stirling cycle power generation system 120 to achieve stable electric output, the thermal storage 140 can be integrated into the power generation system 120 to allow thermal energy to be stored and dispatched when power is required. PCMs are employed as the storage media in the thermal storage tank 148. Operating around a melting point of PCM stabilizes the temperature of the hot end 122 of the Stirling engine 120, thereby maintaining the hot end 122 of the Stirling cycle 120.

The exhaust gas 111 flows over the PCM tank 148 to charge the thermal storage system 140. The PCM tank 148 collects the heat from the exhaust gas 111 of the gas turbine 110 during operation. The heat transfer fluids 141 are circulated by a pump (not shown) to discharge the heat from the thermal storage tank 140. The heated heat transfer fluids 141 then send the heat to the Stirling engine 120 power generation system. The cooled heat transfer fluids 149 return to the PCM storage tank 148 for the next cycle. Pre-heating elements (not shown) are preferably installed in the tanks 148 to melt the PCMs at the beginning. Another function of the pre-heating elements is to make up the heat of the PCMs when it is in an emergent freeze situation. The tank 148 will be operated at atmospheric pressure, similar to commercial oil storage tanks. The proposed tanks 148 are preferably fabricated from stainless steel, and use self-supporting roofs. A heat exchanging tube for transferring thermal energy to superheat vapor is preferably be installed. To reduce heat loss, wall, bottom, and roof of the tanks 148 are insulated preferably with mineral wool batts and calcium silicate block insulation, respectively. The insulated foundation preferably comprises the following layers; (1) concrete slab, (2) foam glass insulation, (3) insulating fire bricks, (4) thin steel plate liner, and (5) sand. A perimeter ring wall of insulating firebricks is preferably provided to support the weight of the walls and roof of the tank 148.

Alternatively, the thermal storage unit 140 also can be embedded in the Stirling engine 120, i.e., directly coupled with the hot end 122 of the Stirling engine 120, to make the system 100 more compact. In this case, the thermal fluid cycle is no longer needed as heat transfer is performed directly between the PCMs of the thermal storage unit 140 and the hot end 122 of the Stirling engine 120.

It can be predicted that LNG is promising in the market of power generation. Natural gas (NG) is an environmentally friendly fuel which is still in high reserve on earth. However, far field transportation of NG is necessary due to significant diversity of distribution of NG on the planet. The most common and economical way to transport NG is to ship the liquid phase as LNG. After delivery, LNG needs to be regasified into gas phase for utilization. The more popular NG is as a fuel in the global market, the more LNG transportation and regasification will be performed. This translates into a large amount of cold energy being produced in the LNG regasification process.

On the other hand, gas turbine power generator is still a very important method to supply electricity in many countries which produces a significant amount of waste heat. It is estimated that cold energy with an amount of 100 MJ will be output per hour for each MWe of power generation for a high efficiency power plant (such as TITAN250 with a capacity of 21.75 MWe). This accounts for just the latent heat of LNG-to-NG phase change alone. The value will be higher if sensible energy is accounted for. Power plants with low capacity (such as SATURN20 with a capacity of 1.21 MWe) consume 50% more fuels and waste around 150 MJ cold energy per hour for each MWe of power generation.

Therefore, the currently disclosed power generation system 100 presents an innovative method to recover this huge amount of cold energy from LNG regasification 130 as well as the heat energy in exhaust gas of the gas turbine 110 to be converted by the Stirling engine 120 into useful work. It has a potential for commercial application in energy industry.

Among the advantages of the power generation system 100, because a Stirling engine 120 is used to utilize the cold energy during regasification process of LNG 130 and the low temperature heat from exhaust gas from the gas turbine 110, the large temperature difference enhances the overall thermal efficiency of the Stirling engine 120. Simultaneous utilization of cold energy and low temperature heat solves the difficulties for recovering them efficiently.

As the thermal storage system 140 on the basis of PCMs is applied to store the exhaust heat and stabilize the temperature of the exhaust gas 111 for the Stirling engine 120, operation of the power generation system 100 is more stable compared to other known systems.

With the power generation system 100, energy stored in LNG 139 including chemical energy and cold energy, and low temperature heat from exhaust gas 111 are all efficiently harnessed. All energy sources for the power generation system 100 come from LNG, and no extra energy sources or fuels are needed. By using LNG cold energy 133 and the gas turbine exhaust heat 111 simultaneously, high efficient recovery of both energies can be achieved with the Stirling engine 120 due to enhancement of thermal efficiency from the large temperature difference and the inherent high efficiency of the Stirling engine 120. Overall efficiency is expected to have an improvement of about 5% to 30% compared with conventional LNG fueled gas turbine power generation systems without recovery of cold energy and exhaust heat.

Using the power generation system 100 described above, referring to FIG. 2, a method 200 of generating power comprises regasifiying LNG in a regasification process to produce natural gas (210), combusting the natural gas in a gas turbine to output power and produce an exhaust gas (220), storing heat obtained from the exhaust gas in a thermal storage unit (230), and heating a hot end of a Stirling engine with heat stored in the thermal storage unit and cooling a cold end of the Stirling engine in the regasification process to output power with the Stirling engine (240).

Whilst there has been described in the foregoing description exemplary embodiments of the present invention, it will be understood by those skilled in the technology concerned that many variations and combinations in details of design, construction and/or operation may be made without departing from the present invention.

The invention claimed is:

1. A power generation system comprising:
a liquefied natural gas (LNG) regasification unit configured to perform a regasification process to regasify LNG supplied from an LNG source to produce natural gas, the regasification process producing cold energy;
a gas turbine configured to combust the natural gas to output power, the combusting producing an exhaust gas;
a thermal storage unit comprising at least one phase change material configured to store heat obtained from the exhaust gas; and
a Stirling engine configured to output power, the Stirling engine having a hot end heated by the heat stored in the thermal storage unit and operating around a melting temperature of the at least one phase change material and a cold end cooled by the cold energy from the regasification process,
wherein a heat exchanger of the regasification unit is embedded with the cold end of the Stirling engine.

2. The power generation system of claim 1, wherein the thermal storage unit is embedded with the hot end of the Stirling engine.

3. A method of power generation, the method comprising the steps of:
(a) regasifiying LNG in a regasification process to produce natural gas, the regasification process producing cold energy;
(b) combusting the natural gas in a gas turbine to output power, the combusting producing an exhaust gas;
(c) storing heat obtained from the exhaust gas in at least one phase change material in a thermal storage unit; and
(d) heating a hot end of a Stirling engine with the heat stored in the thermal storage unit, the hot end of the Stirling engine operating around a melting temperature of the at least one phase change material, and cooling a cold end of the Stirling engine with cold energy from the regasification process to output power with the Stirling engine, wherein a heat exchanger of a regasification unit performing step (a) is embedded with the cold end of the Stirling engine.

4. The method of claim 3, further comprising directly spraying the cold end of the Stirling engine with LNG.

5. The method of claim 3, wherein the thermal storage unit has a temperature ranging from 220° C. to 600° C.

6. The method of claim 3, wherein heating the hot end of the Stirling engine with the heat stored in the thermal storage unit comprises a thermal fluid loop heating the hot end with heat from the at least one phase change material.

7. The method of claim 3, wherein in step (d), the thermal storage unit is embedded with the hot end of the Stirling engine.

8. The power generation system of claim 1, wherein the thermal storage unit has a temperature ranging from 220° C. to 600° C.

9. The power generation system of claim 1, wherein the hot end of the Stirling engine is heated by a thermal fluid loop with heat from the at least one phase change material.

* * * * *